United States Patent
Young

(10) Patent No.: US 7,574,431 B2
(45) Date of Patent: Aug. 11, 2009

(54) REMOTE DATA COLLECTION AND CONTROL USING A CUSTOM SNMP MIB

(75) Inventor: Joel K. Young, Eden Prairie, MN (US)

(73) Assignee: Digi International Inc., Minnetonka, MN (US)

( * ) Notice: Subject to any disclaimer, the term of this patent is extended or adjusted under 35 U.S.C. 154(b) by 411 days.

(21) Appl. No.: 10/443,356

(22) Filed: May 21, 2003

(65) Prior Publication Data

US 2004/0236759 A1    Nov. 25, 2004

(51) Int. Cl.
G06F 7/00 (2006.01)
G06F 17/30 (2006.01)

(52) U.S. Cl. .......................................... 707/4; 709/223

(58) Field of Classification Search .................. 707/102, 707/10, 103 R, 104.1; 709/223, 230, 206, 709/207; 70/103 R
See application file for complete search history.

(56) References Cited

U.S. PATENT DOCUMENTS

| | | | | | |
|---|---|---|---|---|---|
| 4,356,475 | A | * | 10/1982 | Neumann et al. | 340/521 |
| 4,962,473 | A | * | 10/1990 | Crain | 340/541 |
| 4,995,035 | A | * | 2/1991 | Cole et al. | 370/254 |
| 5,101,354 | A | * | 3/1992 | Mowers et al. | 700/92 |
| 5,109,486 | A | * | 4/1992 | Seymour | 709/224 |
| 5,200,987 | A | * | 4/1993 | Gray | 379/40 |
| 5,261,044 | A | * | 11/1993 | Dev et al. | 715/855 |
| 5,261,089 | A | * | 11/1993 | Coleman et al. | 707/8 |
| 5,299,207 | A | * | 3/1994 | Fujii | 714/45 |
| 5,491,796 | A | * | 2/1996 | Wanderer et al. | 709/224 |
| 6,085,245 | A | * | 7/2000 | Kaycee et al. | 709/224 |
| 6,115,393 | A | * | 9/2000 | Engel et al. | 370/469 |
| 6,331,983 | B1 | * | 12/2001 | Haggerty et al. | 370/400 |
| 6,333,931 | B1 | * | 12/2001 | LaPier et al. | 370/385 |
| 6,363,421 | B2 | * | 3/2002 | Barker et al. | 709/223 |
| 6,549,943 | B1 | * | 4/2003 | Spring | 709/223 |
| 6,788,315 | B1 | * | 9/2004 | Kekic et al. | 715/733 |
| 6,788,980 | B1 | * | 9/2004 | Johnson | 700/1 |
| 6,930,984 | B1 | * | 8/2005 | Nomura et al. | 370/254 |
| 6,981,034 | B2 | * | 12/2005 | Ding et al. | 709/223 |
| 2002/0108121 | A1 | * | 8/2002 | Alao et al. | 725/110 |
| 2003/0191781 | A1 | * | 10/2003 | Civanlar et al. | 707/200 |
| 2003/0208530 | A1 | * | 11/2003 | Bhogal et al. | 709/203 |
| 2004/0088386 | A1 | * | 5/2004 | Aggarwal | 709/220 |

OTHER PUBLICATIONS

Content Services Switch Advanced Configuration Guide, Text Part No. 78-11424-01, Dec. 2000, Cisco Systems, Inc.*

(Continued)

*Primary Examiner*—Hosain T Alam
*Assistant Examiner*—Shew-Fen Lin
(74) *Attorney, Agent, or Firm*—Schwegman, Lundberg & Woessner, P.A.

(57) ABSTRACT

A Management Information Base (MIB) in a computer device adapted to use Simple Network Management Protocol (SNMP). The MIB comprises at least one message construct to function as a definition for a constrained attribute set for an object in a remote device that has a device-specific communication protocol. Each message construct includes a number of entries, and each entry stores a user-specified value for the definition of the constrained attribute set. One of the number of entries in the message construct includes a user-specified message string mapped to the constrained attribute set for the object in the remote device. The message string is sufficiently compatible with the device-specific communication protocol for the constrained attribute set and the MIB allows the constrained attribute set to be managed using SNMP.

20 Claims, 3 Drawing Sheets

OTHER PUBLICATIONS

"Simple Network Management Protocol (SNMP)", http://www.cisco.com/univercd/cc/td/doc/cisintwk/ito_doc/snmp.htm (Feb. 20, 2002), 12 pages.

Cohen, Yoram, "SNMP—Simple Network Management Protocol", http://www2.rad.com/networks/1995/snmp/snmp.htm (Mar. 18, 2003), 12 pages.

* cited by examiner

United States Patent US 7,574,431 B2

REMOTE DATA COLLECTION AND CONTROL USING A CUSTOM SNMP MIB

TECHNICAL FIELD

This document relates generally to network management systems and in particular to a custom Management Information Base (MIB) to manage non-network devices in a network system.

BACKGROUND

In managed network information systems, information exchange is facilitated through the use of an application layer protocol. The Simple Network Management Protocol (SNMP) has become a standard application layer protocol in managing devices in such systems. In general, systems using SNMP contain network managers and network agents. The agents communicate with the actual devices to be managed by the system. The devices to be managed on the system can be any device such as a printer, an industrial device that contains a network interface and the like. For example, a user may want to read the output of a temperature sensor on an industrial device or monitor an out-of-toner indicator on a remote printer. Because the managed objects do not communicate in SNMP, the monitoring and managing of the devices by using an agent requires a creation of a Management Information Base (MIB). The MIB is a virtual information database used by the agents.

One of the difficulties with such a system involves defining the various protocols used by the managed devices for translation by an agent. Normally, the MIB needs to be updated when a change is made to the configuration of managed devices. Updating usually requires re-compiling the MIB database to incorporate the changes. Without an agent, users need to understand all of the nuances of each of many possible query/response protocols existing for the managed devices. However a user may not be interested in exhaustively managing a remote device. The user may only be interested in a subset of the attributes of the device. What is needed is an improved means for a user to communicate with remote devices.

SUMMARY

This document describes a Management Information Base (MIB) in a computer device adapted to use Simple Network Management Protocol (SNMP). The MIB comprises at least one message construct to function as a definition for a constrained attribute set for an object in a remote device that has a device-specific communication protocol. Each message construct includes a number of entries, and each entry stores a user-specified value for the definition of the constrained attribute set. One of the entries in the message construct includes a user-specified message string mapped to the constrained attribute set for the object in the remote device. The message string is sufficiently compatible with the device-specific communication protocol for the constrained attribute set and the MIB allows the constrained attribute set to be managed using SNMP.

A network device comprises at least one processor, a network interface to communicate with the at least one processor and a network using a Simple Network Management Protocol (SNMP), and a Management Information Base (MIB) to communicate with the at least one processor and with a remote device. The MIB includes at least one message construct to function as a definition for a constrained attribute set for an object in the remote device that has a device-specific communication protocol. The message constructs include a number of entries, and each entry stores a user-specified value for the definition of the constrained attribute set. One of the entries includes a user-specified message string that is mapped to the constrained attribute set for the object in the remote device. Thus, the MIB allows the network device to function as a user-definable SNMP agent for the constrained attributes.

A method in a computer network managed using a Simple Network Management Protocol (SNMP) is described herein. A Management Information Base is provided with at least one message construct to function as a definition for a constrained attribute set for an object in a remote device that has a device-specific communication protocol. A number of entries are provided for each message construct to store a user-specified value for the definition of the constrained attribute set. A message string stored in one of the number of entries is mapped to the constrained attribute set for the object in the remote device.

This summary is intended to provide an overview of the subject matter of the present application. It is not intended to provide an exclusive or exhaustive explanation of the invention. The detailed description is included to provide further information about the subject matter of the present patent application.

BRIEF DESCRIPTION OF THE DRAWINGS

In the drawings like numerals refer to like components throughout the several views.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

This document discusses a custom MIB. A custom MIB allows a user to interface with managed devices by functioning as an agent for the managed devices. This is done by providing a flexible method of reading and writing a small but critical set of data elements within the managed device.

Figure 1:
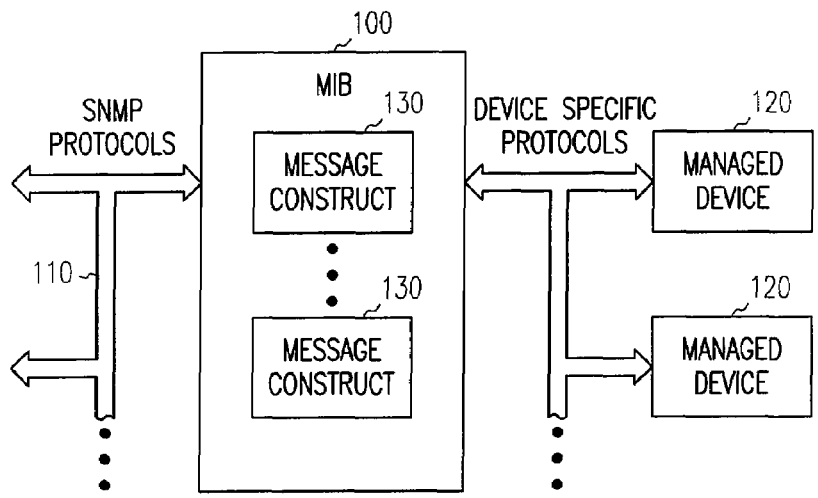
FIG. 1. is an illustration of an embodiment of a Management Information Base (MIB) in a computer device adapted to use Simple Network Management Protocol (SNMP) and to communicate with remote devices that use device-specific protocols.

FIG. 1 is an illustration of an embodiment of a custom MIB 100 in a computer device adapted to use Simple Network Management Protocol (SNMP) to communicate with a network 110 that includes network managers and to communicate with external or remote managed devices 120 by using device-specific protocols. The MIB 100 includes at least one message construct 130 to communicate with a managed device 120. A message construct 130 includes a number of entries. The entries operate as a constrained attribute set for an object in the managed external device. The attribute set is constrained because the entries need to only define a subset of attributes of the managed device 120 that a user needs to manage, rather than define an exhaustive set of attributes. For example, the entries may be configured to only read a paper-out sensor on a printer rather than to additionally read a toner-low sensor. In some embodiments, the MIB includes a web interface and entry configuration is done over the web. One of the entries in a message construct includes a user-specified message string that is mapped to the constrained attribute set for the object in the remote device. The message string is sufficiently compatible with the device-specific communication protocol to allow the custom MIB 100 to communicate with the managed device 120. Thus the constrained attribute set is capable of being managed through the custom MIB 100 using SNMP. The custom MIB 100 is implemented using any combination of software and hardware. In various embodiments, the custom MIB 100 includes at least one of three types of message constructs: a read message construct, a write message construct and an unsolicited message construct.

Figure 2:
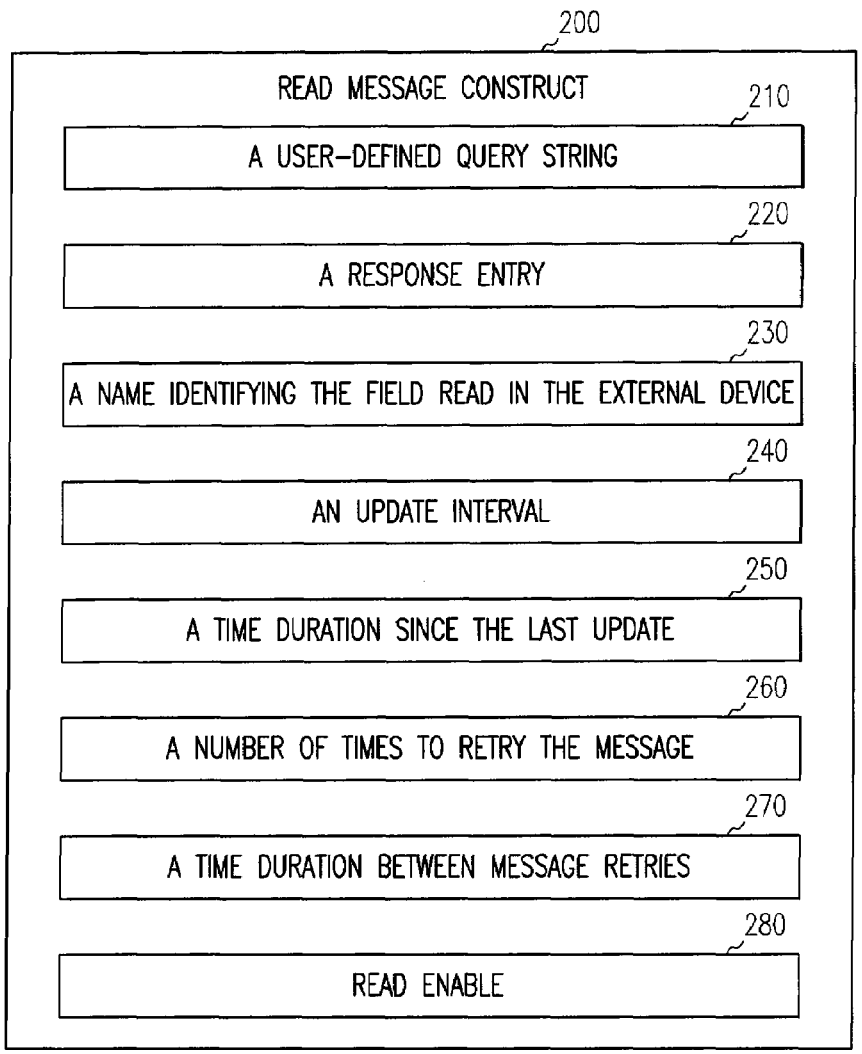
FIG. 2. is an illustration of an embodiment of a read message construct used in an embodiment of the MIB.

FIG. 2 is an illustration of an embodiment of a read message construct 200 used in the custom MIB 100. The read message construct 200 queries a managed device 120 for a read data element within the device 120 and presents the read data element to the user. The value of the read element is updated for the user based on a defined time schedule. For example, the user may request that the value of the read data element be presented to the user on an hourly basis. There are several entries included in a read message construct 200. A query string entry 210 contains a request for information sent over the SNMP network 110 to the managed device 120. The query string 210 is a constrained attribute set defined by the protocol used by the managed device 120. The protocol used by the managed device 120 defines the format used in the string and may be any of the distributed device communication formats used in the art, for example Modbus, Ethernet or DeviceNet. Neither MIB 100 nor the computer device needs to communicate in the protocol of the managed device 120.

A response entry 220 defines the contents of the response message returned by the managed device and the location of the read data element. In one embodiment, the response has the form of a regular expression. A regular expression is a formula, written in a programming language, for sophisticated manipulation and analysis of text data. The regular expression is comprised of regular characters and meta-characters to accomplish the searching and matching of text strings. Thus, the read message construct 200 looks for a match of the string defined by the regular expression to read the data element. A name entry 230 identifies the field read in the managed device 120. An update interval entry 240 defines the frequency with which a read message construct 200 will present the read element value to a user. A last update entry 250 contains a representation of the amount of time that has expired since read element value was last updated to the user or contains a representation of the amount of time until the next update occurs. A retry entry 260 represents the number of times to retry the read message construct 200 if a response from the managed device 120 is not received. A retry interval entry 270 represents of an amount of time to wait between retries of the read message construct 200. A read enable entry 280 enables the definition of a number of elements in the managed device 120. The enablement is selective in that not all of the elements need to be enabled at once. One of ordinary skill in the art would understand, upon reading and comprehending this disclosure, that various embodiments of the read message construct include various combinations of the illustrated entries.

Figure 3:
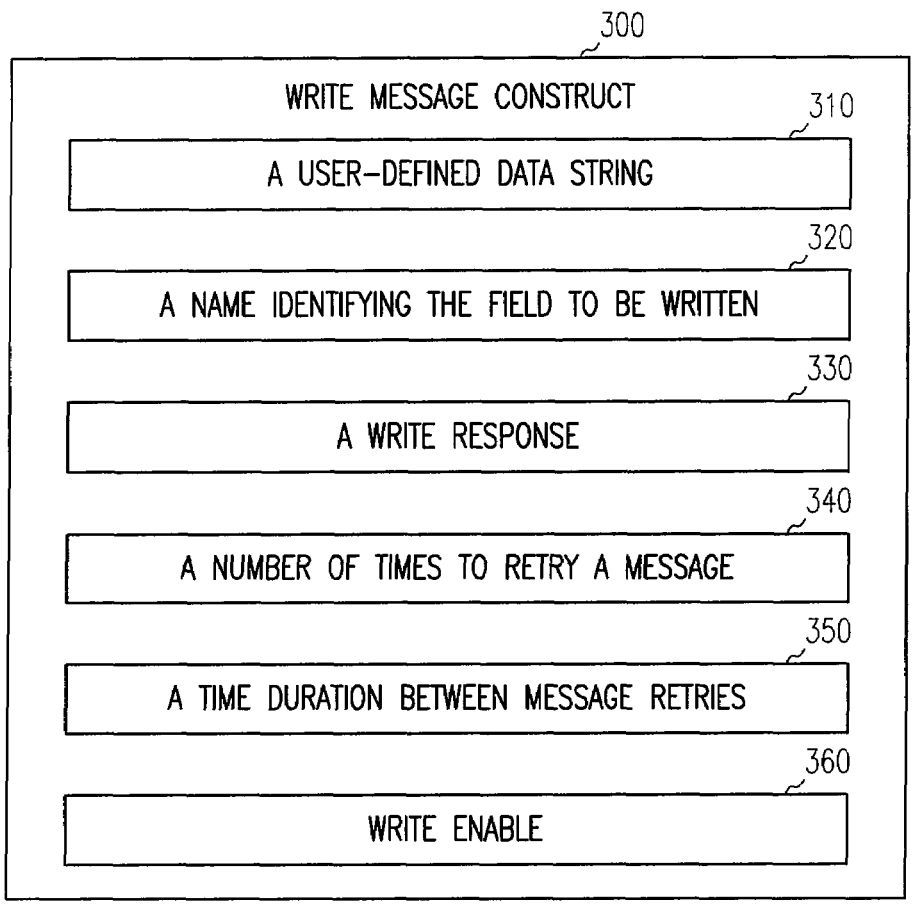
FIG. 3. is an illustration of an embodiment of a write message construct used in an embodiment of the MIB.

FIG. 3 is an illustration of an embodiment of a write message construct 300 used in the MIB 100. The write message construct 300 presents a value to a particular register within the constrained attribute set of the managed device 120 that is to be written. A write message construct 300 includes a number of entries. A user-specified data string entry 310 includes a data string that is presented to the managed device 120 for writing. In one embodiment, the data string has the format of a regular expression to match and modify a string or set of strings within the managed device 120. A name entry 320 identifies the field to be written in the managed device 120. A write response entry 330 is a response to the write message construct 300 and contains feedback from the managed device as to whether the data string was successfully written. A retry entry 340 represents of the number of times to retry the write message construct 300 if a response from the managed device 120 is not received. A retry interval entry 350 is a representation of an amount of time to wait between retries of the read message construct 300. A write enable entry 360 enables the definition of a number of elements. As with the read enable entry 280, the enablement is selective in that not all of the elements need to be enabled at once. One of ordinary skill in the art would understand that various embodiments of the write message construct include various combinations of the illustrated entries.

Figure 4:
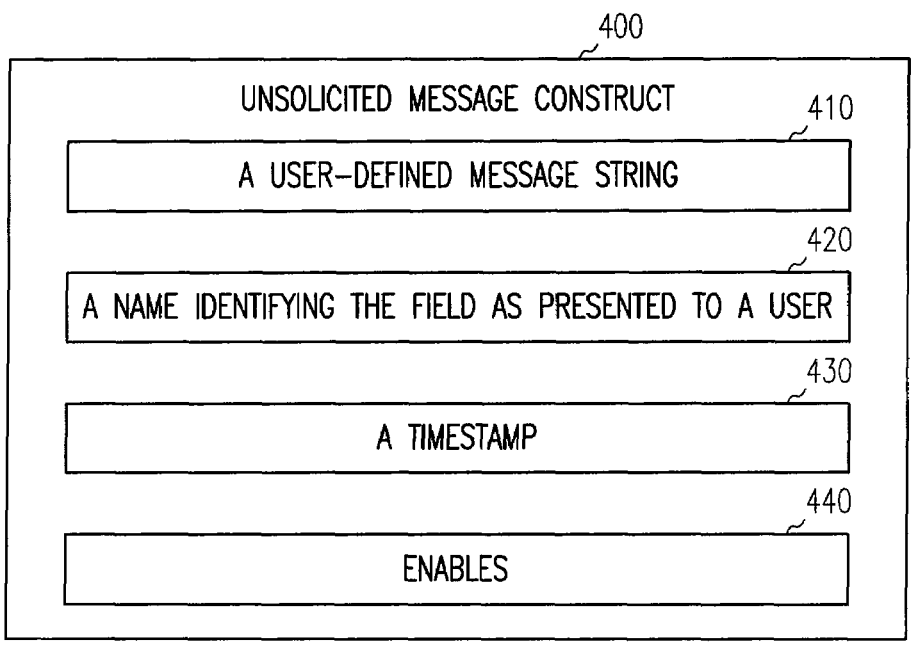
FIG. 4. is an illustration of an embodiment of an unsolicited message construct used in an embodiment of the MIB.

FIG. 4 is an illustration of an embodiment of an unsolicited message construct 400 used in the MIB 100. An unsolicited message construct 400 presents information from a managed device 120 that was not requested by a master device connected to SNMP network 110 such as a network manager or user interface. An unsolicited message construct 400 also includes a number of entries. A user-specified message string entry 410 includes a data string presented to a master device on the SNMP network. The data string includes the format of the data and the data element to be presented. In one embodiment the data string is in the form of a regular expression. A name entry 420 identifies a field in the remote device as presented to a master device. A time stamp entry 430 includes a representation of the time that the message originated from the managed device 120. An enable entry 440 enables the definition of a number of data elements, but not all elements are required to be enabled. One of ordinary skill in the art would understand that various embodiments of the unsolicited message construct include various combinations of the illustrated entries.

Figure 5:
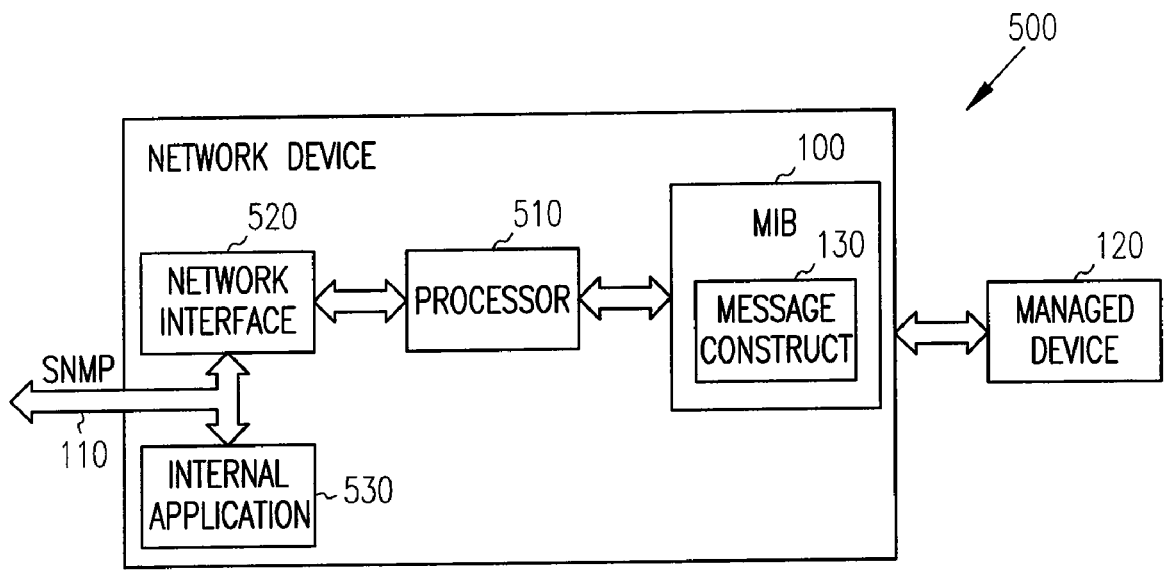
FIG. 5 is an illustration of an embodiment of a network device that uses an embodiment of the MIB.

FIG. 5 is an illustration of an embodiment of a network device 500 that uses the MIB 100. The network device 500 includes at least one processor 510, at least one custom MIB 100, and at least one network interface 520 to communicate with a network 110 running SNMP. The network device 500 can be any device capable of communicating with the SNMP network 110 such as a network hub, router or server. The network interface 520 communicates over the SNMP network 110 with any combination of applications internal (represented in FIG. 5 as 530) or applications external to the network device 500.

The custom MIB 100 provides communication with managed device 120 by the use of at least one message construct 130. The message constructs 130 operates to define a constrained attribute set for a managed object in a managed device 120 having a device-specific communication protocol. In one embodiment, the network device 500 includes a web browser interface to provide communication between the network and the MIB. In another embodiment, the MIB 100 is provided on a computer readable medium such as a CD-ROM and is installed on a device server. The computer readable medium would include a message construct module containing the at least one of the three types of message constructs 130 and a messaging module to access the constrained attribute sets of the managed devices using message strings. One of ordinary skill in the art would understand that various embodiments of the network device include various combinations of the illustrated interfaces and modules.

The MIB allows the network device to function as a user-definable SNMP agent for the constrained attributes of the managed device object. Thus, a user is able to communicate with remote managed devices in a flexible manner without a need to define an exhaustive set of attributes for the managed devices and without having to understand the protocol of the managed devices.

Figure 6:
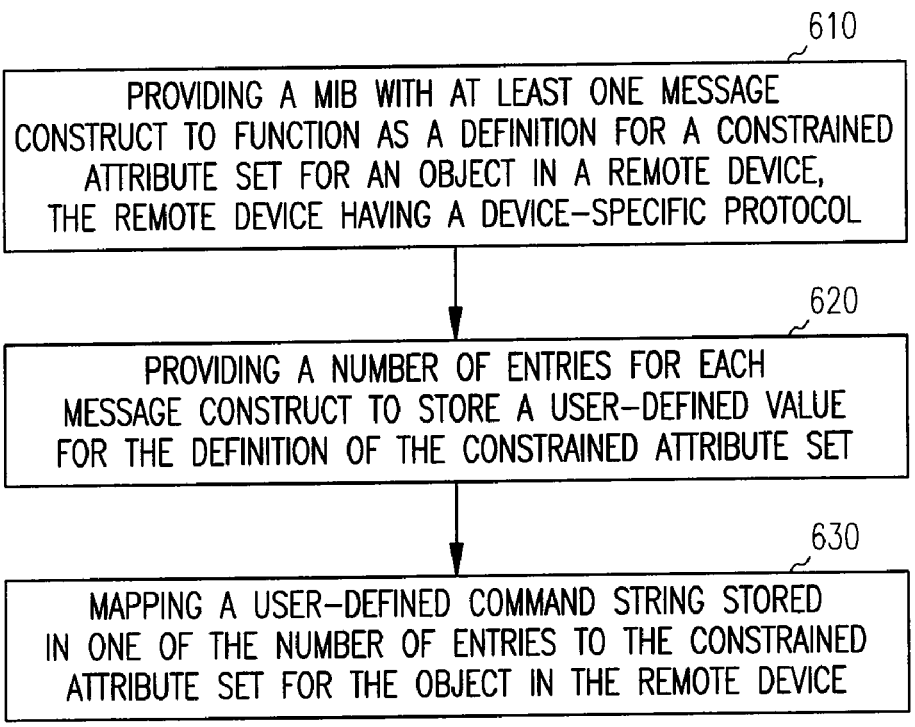
FIG. 6 is a flowchart of an embodiment of a method of using a MIB in a computer device adapted to use Simple Network Management Protocol (SNMP) and to communicate with remote devices that use device-specific protocols.

FIG. 6 is a flowchart of an embodiment of a method of using a MIB in a computer device adapted to use SNMP and to communicate with remote managed devices 120 that use device-specific protocols. At 610, a custom MIB 100 is provided with at least one message construct to function as a definition for a constrained attribute set for an object in a remote managed device 120. The object in the remote device 120 has a device-specific communication protocol. At 620, a number of entries are provided for each message construct 130 to store a user-specified value for the definition of the constrained attribute set. At 630, user-specified message string stored in one of the number of entries is mapped to the constrained attribute set for the object in the remote device.

Although specific examples have been illustrated and described herein, it will be appreciated by those of ordinary skill in the art that any arrangement calculated to achieve the same purpose could be substituted for the specific example shown. This application is intended to cover any adaptations or variations of the present invention. Therefore, it is intended that this invention be limited only by the claims and the equivalents shown.

What is claimed is:

1. A method for collecting and controlling remote data using a Management Information Base (MIB) in a computer device adapted to use Simple Network Management Protocol (SNMP), the computer device having a processor to communicate with a remote device, the MIB comprising:

at least one message construct to communicate with a remote managed device, including a read message construct to read a data element from the remote device, the read message construct having a plurality of entries that define a constrained attribute set for an object in the remote device, wherein the object in the remote device has a device-specific communication protocol, wherein the plurality of entries includes:

a user-specified query string mapped to the data element in the constrained attribute set for the object in the remote device, wherein a format of the user-specified message string is sufficiently compatible with the device-specific communication protocol to read the data element of the object in the remote device thereby providing a device protocol compatible message construct;

an entry that includes a regular expression to identify the data element within the remote device through matching a data string;

a response entry to store the data element such that the at least one data element is available for SNMP messages;

a name entry to identify a field read in the remote device as presented to the user;

an update interval entry representing a frequency of reading the data element;

a last update entry representing a time duration since the last update;

a read enable entry to allow definition of fields in the remote device;

a retry entry to define a number of times to retry the read message when a response entry is not received;

a retry interval entry to define a time interval between read message retries when a response to the read message is not received, and wherein, to manage the constrained attribute set, the MIB communicates with a network manager using SNMP and communicates with the remote device using the device protocol compatible message construct.

2. The method of claim 1, wherein the response entry includes the regular expression.

3. The method of claim 1, wherein the at least one message construct includes an unsolicited message construct for recognizing at least one data element from the object of the remote device that was not requested, the unsolicited message construct including a message string to recognize the unsolicited message that is within the constrained attribute set.

4. The method of claim 3, wherein the number of entries for the unsolicited message construct further includes:

a name entry to identify the field in the remote device as presented to the user;

a timestamp entry to identify when the unsolicited message originated from the remote device; and an enable entry containing enables to allow definition of fields in the remote device.

5. The method of claim 3, wherein the message string includes the user-specified message string and the regular expression.

6. The method of claim 1, wherein the at least one message construct includes:

a write message construct to write at least one data element in the constrained attribute set to the remote device, the number of entries for the write message construct including a user-specified data string to write the at least one data element in the constrained attribute set; and an unsolicited message construct to recognize at least one data element from the object of the remote device that was not requested, the unsolicited message construct including a user-specified message string to recognize the unsolicited message that is within the constrained attribute set.

7. The method of claim 6, wherein the response entry includes the regular expression.

8. The method of claim 1, wherein the MIB further includes a web browser interface used to provide the user-specified message string mapped to the constrained attribute set.

9. The method of claim 1, wherein the user-specified message string mapped to the constrained attribute set is provided by the user through an SNMP manager.

10. The method of claim 1, wherein the MIB is implemented in software.

11. The method of claim 1, wherein the MIB is implemented in hardware.

12. The method of claim 1, wherein the MIB is implemented in a combination of hardware and software.

13. A method for collecting and controlling remote data using a Management Information Base (MIB) in a computer device adapted to use Simple Network Management Protocol (SNMP), the computer device having a processor and a memory to store the MIB, the MIB comprising:

at least one message construct to communicate with a remote managed device, including a write message construct having a plurality of entries that define a constrained attribute set for an object in the remote device, wherein the object in the remote device has a device-specific communication protocol, wherein the write message writes at least one data element in the constrained attribute set to the remote device, wherein the plurality of entries includes:

a user-specified data string mapped to the data element of the constrained attribute set in the remote device, wherein a format of the user-specified data string is sufficiently compatible with the device-specific communication protocol to write the at least one data element in the constrained attribute set in the remote device thereby providing a device protocol compatible message construct;

an entry that includes a regular expression to identify a data element within the remote device through matching a data string;

a name entry to identify a field in the remote device as presented to the user;

a write response entry indicating the success of the write message;

a write enable entry to allow definition of fields in the remote device;

a retry entry to define a number of times to retry the write message when a response entry is not received;

a retry interval entry to define a time interval between write message retries when a response to the write message is not received, and wherein, to manage the constrained attribute set, the MIB communicates with a network manager using SNMP and communicates with the remote device using the device protocol compatible message construct.

14. A network device, comprising:

at least one processor;

a network interface to communicate with the processor and a network using a Simple Network Management Protocol (SNMP); and a Management Information Base (MIB) to communicate with the processor and with a remote managed device, wherein the MIB includes:

a read message construct included in the MIB to read at least one data element from a remote managed device, the read message construct having a plurality of entries that define a constrained attribute set for an object in the remote device, wherein the object in the remote device has a device-specific communication protocol, wherein the plurality of entries includes:

a user-specified query string mapped to the data element in the constrained attribute set for the object in the remote device, wherein a format of the user-specified message string is sufficiently compatible with the device-specific communication protocol to read the data element of the object in the remote device thereby providing a device protocol compatible message construct;

an entry that includes a regular expression to identify the data element within the remote device through matching a data string;

a response entry to store the data element such that the at least one data element is available for SNMP messages;

a name entry to identify a field read in the remote device as presented to the user;

an update interval entry representing a frequency of reading the data element;

a last update entry representing a time duration since the last update;

a read enable entry to allow definition of fields in the remote device, a retry entry to define a number of times to retry the read message when a response entry is not received;

a retry interval entry to define a time interval between read message retries when a response to the read message is not received, and wherein, to manage the constrained attribute set, the MIB communicates with a network manager using SNMP and communicates with the remote device using the device protocol compatible message construct.

15. The network device of claim 14, wherein the network interface is implemented as a web browser interface.

16. The network device of claim 14, wherein the network interface communicates over the network with applications internal and applications external to the network device.

17. A computer readable medium including computer executable instructions, which when executed by the computer, causes the computer to implement a Management Information Base (MIB) configured to be accessed using Simple Network Management Protocol (SNMP), the computer readable medium comprising:

at least one message construct module to define a constrained attribute set for an object in a remote managed device and to allow the MIB to communicate with the object in the remote device using a device-specific communication protocol, a read message construct of the module including a number of entries, each of the number of entries to define the constrained attribute set and to store a user-specified value to define the constrained attribute set, at least one of the number of entries including a message string having a format sufficiently compatible with the device-specific communication protocol to allow the MIB to communicate with the object in the remote device and the MIB allows the constrained attribute set to be managed using SNMP, and the number of entries including:

a regular expression to identify a data element within the remote device through matching a data string;

a user-specified query string to request the at least one data element in the constrained attribute set;

a response entry to store the at least one data element such that the at least one data element is available for SNMP messages;

a name entry to identify a field read in the remote device as presented to the user;

an update interval entry representing a frequency of reading the data element;

a last update entry representing a time duration since the last update;

a read enable entry to allow definition of fields in the remote device;

a retry entry to define a number of times to retry the read message when a response entry is not received;

a retry interval entry to define a time interval between read message retries when a response to the read message is not received, and a messaging module to access a constrained attribute set using the device protocol compatible message string.

18. A computer readable medium including computer executable instructions, which when executed by the computer, causes the computer to implement a Management Information Base (MIB) configured to be accessed using Simple Network Management Protocol (SNMP), the computer readable medium comprising:

at least one message construct module to define a constrained attribute set for an object in a remote managed device and to allow the MIB to communicate with the object in the remote device using a device-specific communication protocol, a write message construct of the module including a number of entries for writing at least one data element in the constrained attribute set to the remote device, each of the number of entries to define the constrained attribute set and to store a user-specified value to define the constrained attribute set, at least one of the number of entries including a message string having a format sufficiently compatible with the device-specific communication protocol to allow the MIB to communicate with the object in the remote device, and the number of entries for the write message construct including:

a regular expression to identify a data element within the remote device through matching a data string;

a user-specified data string to write the at least one data element in the constrained attribute set;

a name entry to identify a field in the remote device as presented to the user;

a write response entry indicating the success of the write message;

a retry entry to define a number of times to retry the write message when a response entry is not received;

a retry interval entry to define a time interval between write message retries when a response to the write message is not received; and a write enable entry to allow definition of fields in the remote device; and a messaging module to access a constrained attribute set using the device protocol compatible message string.

19. The computer readable medium of claim 17, wherein the at least one message construct includes an unsolicited message construct for recognizing at least one data element from the object of the remote device that was not requested, the unsolicited message construct including a user-specified message string to recognize the unsolicited message that is within the constrained attribute set.

20. The computer readable medium of claim 19, wherein the number of entries for the unsolicited message construct further includes:

a name entry to identify the field in the remote device as presented to the user;

a timestamp entry to identify when the unsolicited message originated from the remote device; and an enable entry containing enables to allow definition of fields in the remote device.

* * * * *

UNITED STATES PATENT AND TRADEMARK OFFICE
CERTIFICATE OF CORRECTION

PATENT NO. : 7,574,431 B2
APPLICATION NO. : 10/443356
DATED : August 11, 2009
INVENTOR(S) : Joel K. Young Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 537 days.

Signed and Sealed this

Seventh Day of September, 2010

David J. Kappos
*Director of the United States Patent and Trademark Office*